(12) United States Patent
Dong et al.

(10) Patent No.: US 9,014,490 B2
(45) Date of Patent: Apr. 21, 2015

(54) METHOD TO MEASURE LOCAL IMAGE SIMILARITY AND ITS APPLICATION IN IMAGE PROCESSING

(75) Inventors: Xiaogang Dong, Germantown, MD (US); Farhan Baqai, Fremont, CA (US); Kenichi Nishio, Yokohama (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 12/931,962

(22) Filed: Feb. 15, 2011

(65) Prior Publication Data

US 2012/0207396 A1   Aug. 16, 2012

(51) Int. Cl.
*G06K 9/62* (2006.01)
*G06T 5/00* (2006.01)

(52) U.S. Cl.
CPC .............. *G06K 9/6215* (2013.01); *G06T 5/002* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 2003/0152275 A1 | 8/2003 | Chung et al. | |
| 2007/0122005 A1* | 5/2007 | Kage et al. | 382/115 |
| 2008/0239094 A1* | 10/2008 | Baqai et al. | 348/223.1 |
| 2009/0220172 A1* | 9/2009 | Wajs | 382/284 |
| 2010/0104158 A1* | 4/2010 | Shechtman et al. | 382/131 |
| 2012/0105728 A1* | 5/2012 | Liu | 348/607 |

FOREIGN PATENT DOCUMENTS

WO   WO 2010/010349 A1   1/2010

OTHER PUBLICATIONS

Eli Shechtman, Michal Irani, Matching Local Self-Similarities Across Images and Videos, http://www.wisdom.weizmann.ac.il/~vision/VideoAnalysis/Demos/SelfSimilarities/SelfSimilarities_ShechtmanIrani07.pdf, Jul. 16, 2007, Minneapolis, MN, p. 1-8.
Qin LV, Moses Charikar, Kai Li, Image Similarity Search With Compact Data Structures, http://www.cs.princeton.edu/cass/papers/LCL04.pdf, Department of Computer Science Princeton University, 2004, p. 1-10.

* cited by examiner

*Primary Examiner* — Kim Vu
*Assistant Examiner* — Fred Hu
(74) *Attorney, Agent, or Firm* — Gregory J. Koerner; Redwood Patent Law

(57) ABSTRACT

A method for effectively performing local image similarity measurement is proposed. A system equipped with such a method for effectively performing an image processing task includes an image processor that performs an intermediate-results calculation procedure to calculate intermediate result values that are based upon corresponding pixels of a target patch and one or more similar patches. The image processor typically moves the target patch of the intermediate-results calculation to different locations in a raster order or some other organized order. The image processor then performs an intermediate-results combination procedure by calculating appropriate statistics of the intermediate result values to produce processed pixel values. A processor device typically controls the image processor to effectively perform the image processing tasks including, but not limited to, demosaicing and denoising.

20 Claims, 10 Drawing Sheets

METHOD TO MEASURE LOCAL IMAGE SIMILARITY AND ITS APPLICATION IN IMAGE PROCESSING

BACKGROUND SECTION

1. Field of the Invention

This invention relates generally to techniques for processing image data, and relates more particularly to a system and method for effectively performing local image similarity measurement.

2. Description of the Background Art

It is an important problem in image processing to measure local image similarity. Image similarity can be categorized into 3 classes: 1) Low level similarity. Local image patches are considered to be similar if some distance metric (e.g. p-norm, EarthMovers, Mahalanobis) is less than a given threshold; 2) Mid-level similarity. Here local image patches share some simple semantic property; and 3) High-level similarity. In this case, similarity is primarily defined by semantics. Properties that make two patches similar are not visual but they can be inferred from visual information such as a gesture. More detailed information may be found in "Learning Task-Specific Similarity, PhD Thesis," by Greg Shakhnarovich, Department of Electrical Engineering and Computer Science, Massachusetts Institute of Technology, 2005.

Demosaicing is a digital image process to reconstruct a full color image from the incomplete color samples output from an image sensor overlaid with a color filter array (CFA). In a CFA, only one color per pixel is measured. There are several different configurations of CFA. The most popular CFA is the Bayer pattern as described by B. E. Bayer in "Color Imaging Array", U.S. Pat. No. 3,971,065, Jul. 20, 1976. It consists of three colors: red, green, and blue. Among all pixels, there are 25% red, 50% green, and 25% blue pixels. In order to improve color reproduction accuracy, T. Mizukura et al. proposed a four-color CFA in "Image pick-up device and image pick-up method adapted with image pick-up sensitivity", U.S. Pat. No. 7,489,346, Feb. 10, 2009. Yoshihara et al. proposed to arrange the Bayer colors in a zigzag arrangement instead of a rectangular array, which improves fill factor and pixel sensitivity as described in "A 1/1.8-inch 6.4 MPixel 60 frames/s CMOS Image Sensor With Seamless Mode Change", IEEE J. Solid-State Circuits, Vol. 41, No. 12, December 2006, pp. 2998-3006. Most sophisticated demosaicing algorithms utilize the strong correlation of high-frequency information among different color channels. They may copy high frequency information from one color channel to other color channels that are unknown at a given pixel location. To do this effectively, demosaicing algorithms need to infer local image structure by identifying local image patches that share similar local geometry.

Similar to demosaicing, denoising is another estimation problem relying on local image similarity measurement. The objective of image denoising is to estimate a noise-free pixel from digital images degraded by noise. The key to achieve a good estimate at a pixel location is to find a set of pixels that share similar local structures in the degraded images. Once the set of similar pixels are found, there are various ways to obtain denoised pixel value of the current pixel location including simple average, median, and other appropriate statistics. More sophisticated algorithms often utilize a weighted average of the pixels in the similar pixel set. The weights are able to be determined in many ways such as proximity, similarity, noise level or a combination thereof. For example, see F. Baqai, "System and method for denoising using signal dependent adaptive weights", U.S. patent application Ser. No. 12/284,055, filed on Sep. 18, 2008.

It is interesting to note that demosaicing and denoising share a common process of finding similar local image structures in the presence of various degradations such as blur, distortions, and noise. In order to utilize local image similarity measurement more efficiently, some methods aim to do joint demosaicing and denoising by first estimating the basic structure and then iteratively fine tuning the result as described by A. Buades et al. in "Self-similarity driven color demosaicing", IEEE TIP, Vol. 18, No. 6, June 2009, pp. 1192-1202 and K. Hirakawa and T. Parks in "Joint demosaicing and denoising", IEEE TIP, Vol. 15, No. 8, August 2006, pp. 2146-2157.

One important part of local image similarity measurement is to select an appropriate similarity metric. There are many existing metrics for low-level image similarity in the literature. For instance, one quite popular metric is based on Euclidean distance (L2 norm) between pixels as described by C. Tomasi and R. Manduchi in "Bilateral Filtering for Gray and Color Images," Proc. of IEEE International Conference on Computer Vision, pp. 841-846, 1998. However, this metric is very sensitive to lighting conditions and noise. More robust patch-based Euclidean distances have been proposed in "Self-similarity driven color demosaicing," cited above. F. Baqai et al. proposed patch-based L1 distances to measure local image similarity in "A Method to Measure Local Image Similarity Based on the L1 Distance Measure", U.S. patent application Ser. No. 12/567,454, filed on Sep. 25, 2009.

Another critical part of the local image similarity measure is the threshold at which a pixel or an image patch is considered to be similar. The selection of a threshold is based on various factors such an estimate of the degree of degradation in the image, similarity criterion, distance metric (L1, L2, and others), and patch size. If the threshold is too large, the similar measure may include some pixels that are not similar. If it is too small, the similar measure will not find a statistically significant number of similar pixels. An incorrectly selected threshold may cause several artifacts such as zipper effect, blur, and false colors in demosaicing. Similarly, denoising may not adequately remove noise (under smooth), or it may blur edges and texture (over smooth) if the threshold is not set at an appropriate level.

F. Baqai et al. utilize a relationship between distances measures to estimate appropriate thresholds in "A Method to Measure Local Image Similarity Based on the L1 Distance Measure", cited above. Such a threshold can be represented as a product of the standard error sigma of local image intensities and a constant t that is not related to sigma and determined by some factors, but not limited to, such as patch sizes and pixel-similarity rates. Note that estimation of standard error sigma of local image intensities is generally not perfect. The stronger degradation an image has, the larger estimation error there is. If the estimated sigma is significantly larger than the true value, a lot of pixels that are not similar will be included in the similar pixel set. On the other hand, if the estimated sigma is significantly smaller than the true value, a lot of pixels that are similar will be excluded from the similar pixel set. Under both of above mentioned scenarios, the performance of local similarity measuring will be severely deteriorated. Therefore reducing the estimation error of standard error sigma of local image intensities is a key to further improve local similarity measurement under strong degradation of images.

SUMMARY

In accordance with the present invention, a method is disclosed for more effectively performing a local image similarity measuring and such a method can be implemented in an image processing system to complete various image processing tasks including, but not limited to, denoising and demosaicing. In accordance with one embodiment of the present invention, an image processor or other appropriate entity initially selects a target patch of pixels in a window of image data. The image processor may then analyze the similarity of all candidate patches with respect to the target patch to thereby determine which candidate patches may be classified as similar patches.

In certain embodiments, the image processor may select a current sigma value for performing the similarity determination procedure based upon the relative magnitude of a center pixel in the current target patch. Furthermore, the image processor may efficiently obtain the sigma value from a lookup table that has previously been calculated with sigma values for all possible pixel values. The image processor may then utilize a three-dimensional (3D) pixel array of the similar patches and the target patch to perform an intermediate-result calculation procedure during which a set of intermediate result values for the entire target patch is produced by taking averages, or medians, or other appropriate statistics of corresponding pixels from all the similar patches and the target patch in the task of denoising or demosaicing. The image processor typically stores the foregoing set of intermediate result values for the current target patch into an intermediate results buffer.

The image processor then determines whether any possible target patches remain that have not been subject to the foregoing intermediate-results calculation procedure. If additional target patches remain, then the image processor moves to a new current target patch, and derives a new set of intermediate result values in a similar manner for storage in the intermediate results buffer. After all possible target patches have had intermediate result values calculated and stored, then the image processor may perform an intermediate-results combination procedure that separately taking averages, or medians, or other appropriate statistics of the buffered intermediate result values for each of the respective pixel locations to produce final pixel values for the entire image. The entire image processing along with local image similarity measurement may then terminate. For all of the foregoing reasons, the present invention therefore provides an improved method for effectively performing a local image similarity measuring procedure and an image processing system equipped with such method may produce an improved results of image processing tasks including, but not limited to, demosaicing and denoising.

DETAILED DESCRIPTION

The present invention relates to an improvement in image processing systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a method for effectively performing a local image similarity measurement and a system equipped with such a method to complete image processing tasks including demosaicing and denoising. The system may include an image processor that performs an intermediate-results calculation procedure to calculate intermediate result values that are based upon corresponding pixels of a target patch and one or more similar patches. The image processor typically moves the target patch of the intermediate-results calculation to different locations in raster order (left to right and top to bottom) or some other organized order. The image processor then performs an intermediate-results combination procedure by taking averages, medians, or other appropriate statistics of the intermediate result values to produce processed pixel values. A processor device typically controls the image processor to effectively perform the image processing tasks.

Figure 1:
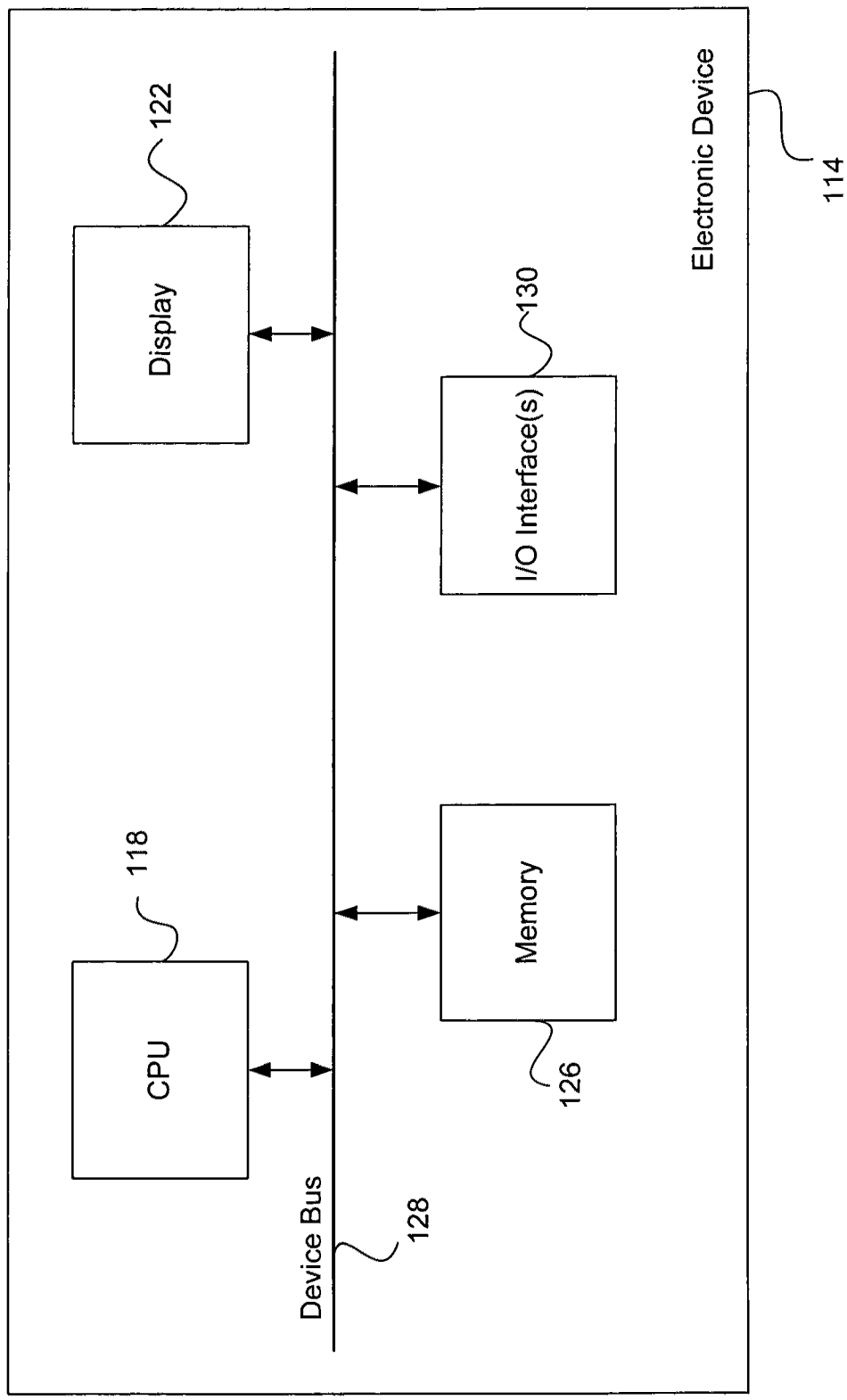
FIG. 1 is a block diagram of an electronic device, in accordance with one embodiment of the present invention.

Referring now to FIG. 1, a block diagram for one embodiment of an electronic device 114 is shown, in accordance with the present invention. In the FIG. 1 embodiment, electronic device 114 may include, but is not limited to, a central processing unit (CPU) 118, a display 122, a memory 126, and input/output interfaces (I/O interfaces) 130. Selected ones of the foregoing components of electronic device 114 may be coupled to, and communicate through, a device bus 128. In alternate embodiments, electronic device 114 may be implemented using components and configurations in addition to, or instead of, certain of those components and configurations discussed in conjunction with the FIG. 1 embodiment. In addition, electronic device 114 may alternately be implemented as any other desired type of electronic device or entity. For example, electronic device 114 may be implemented as a digital camera or a personal computer.

In the FIG. 1 embodiment, CPU 118 may be implemented to include any appropriate and compatible microprocessor device that executes software instructions to thereby control and manage the operation of electronic device 114. The FIG. 1 embodiment, display 122 may include any effective type of display technology including a cathode-ray-tube monitor or a liquid-crystal display device with an appropriate screen for displaying various information to a device user.

In the FIG. 1 embodiment, memory 126 may be implemented to include any combination of desired storage devices, including, but not limited to, read-only memory (ROM), random-access memory (RAM), and various types of non-volatile memory, such as floppy disks or hard disks. The contents and functionality of memory 126 are further discussed below in conjunction with FIG. 2. In the FIG. 1 embodiment, I/O interfaces 130 may include one or more input and/or output interfaces to receive and/or transmit any required types of information for electronic device 114. Additional details regarding the implementation and utilization of electronic device 114 are further discussed below in conjunction with FIGS. 2 through 8.

Figure 2:
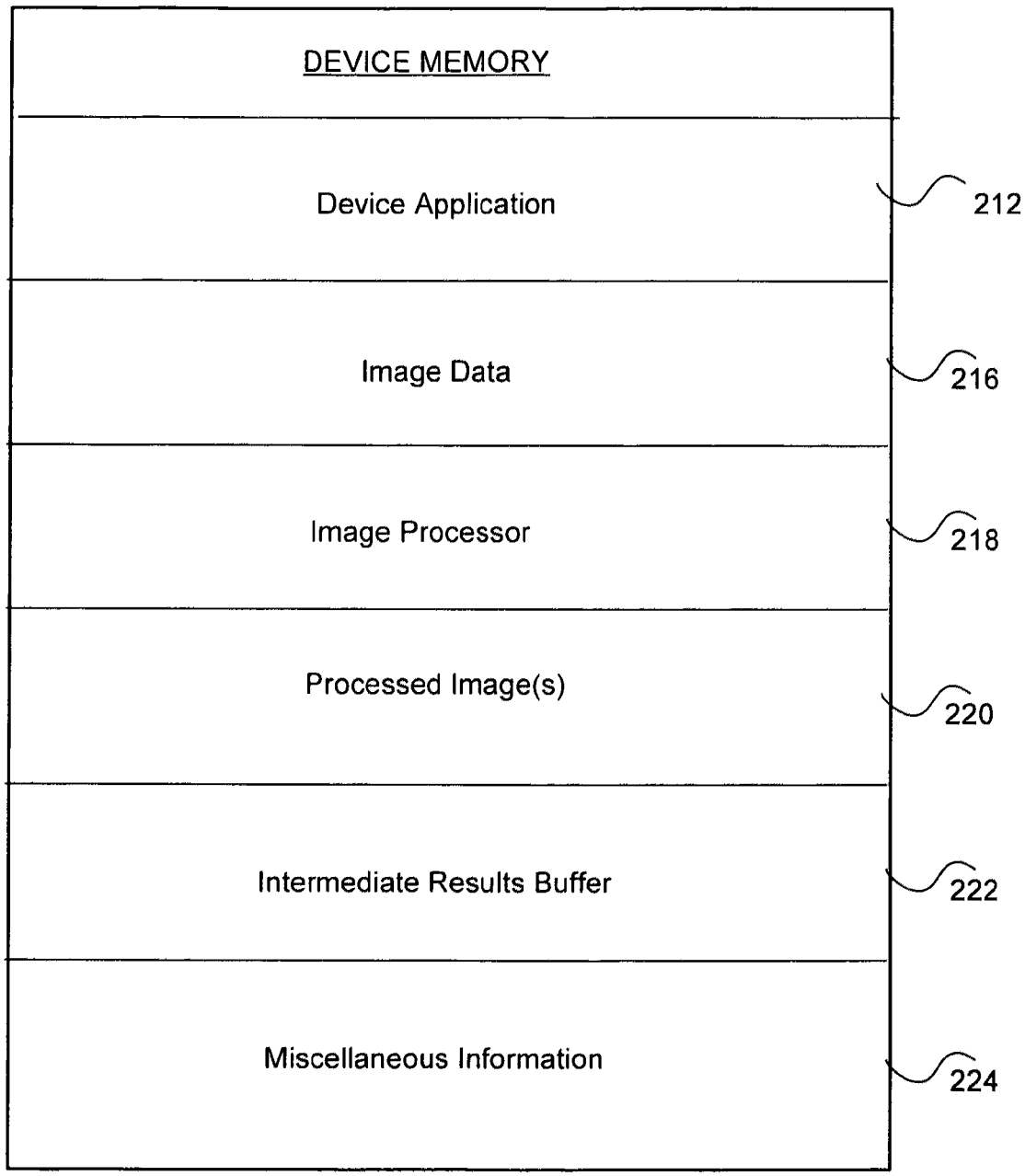
FIG. 2 is a block diagram for one embodiment of the device memory of FIG. 1, in accordance with the present invention.

Referring now to. FIG. 2, a block diagram for one embodiment of the FIG. 1 memory 126 is shown, in accordance with the present invention. In the FIG. 2 embodiment, memory 126 includes, but is not limited to, a device application 212, image data 216, an image processor 218, an intermediate results buffer 222, processed image(s) 220, and miscellaneous information 224. In alternate embodiments, memory 126 may include components and functionalities in addition to, or instead of, certain of those components and functionalities discussed in conjunction with the FIG. 2 embodiment.

In the FIG. 2 embodiment, device application 212 may include program instructions that are preferably executed by CPU 118 (FIG. 1) to perform various functions and operations for electronic device 114. The particular nature and functionality of device application 212 typically varies depending upon factors such as the specific type and particular functionality of the corresponding electronic device 114. In the FIG. 2 embodiment, image processor 218 may utilize intermediate results buffer 222 for performing an image processing tasks including, but not limited to, demosaicing and denoising on image data 216 to produce processed image(s) 220 by utilizing any effective techniques or methods. In the FIG. 2 embodiment, miscellaneous information 224 may include any type of other data or software instructions for use by electronic device 114.

In the FIG. 2 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. Additional details regarding the implementation and utilization of denoiser 218 are further discussed below in conjunction with FIGS. 3 through 8.

Figure 3:
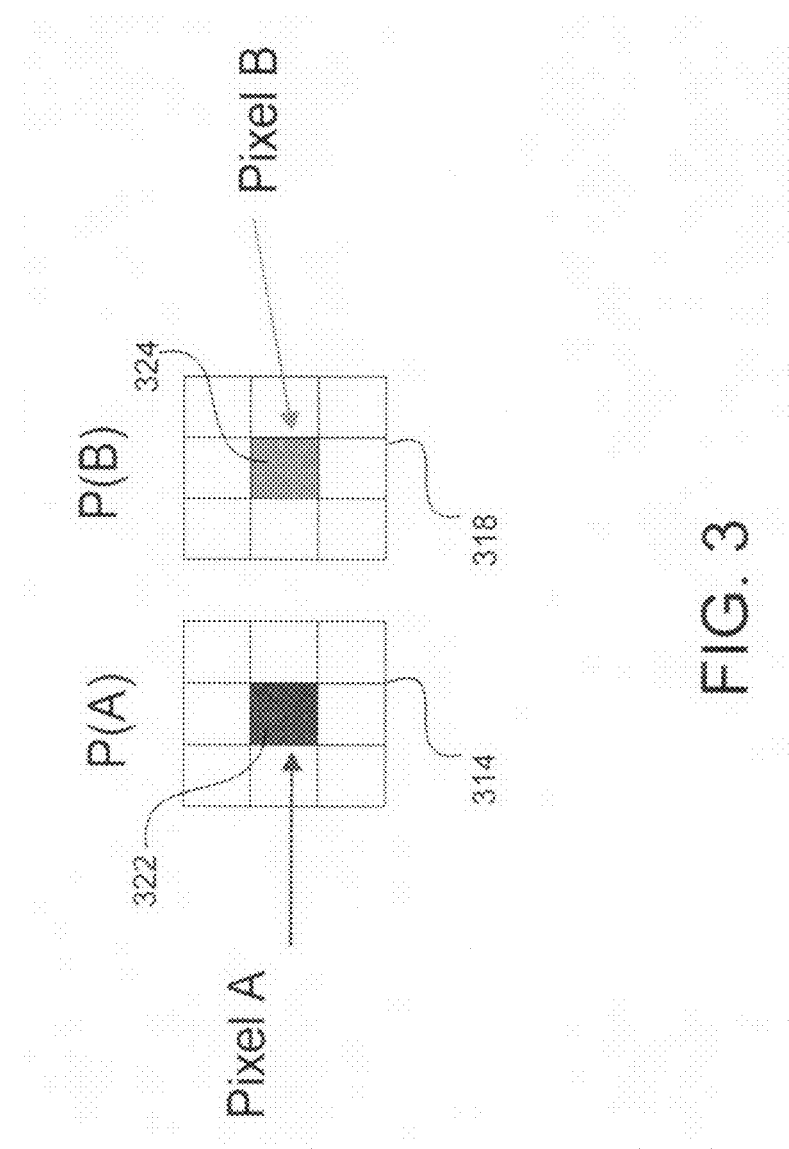
FIG. 3 is a diagram for illustrating a similarity determination procedure, in accordance with one embodiment of the present invention.

Referring now to FIG. 3, a diagram for illustrating a similarity determination procedure is shown, in accordance with one embodiment of the present invention. The FIG. 3 embodiment is presented for purposes of illustration, and in alternate embodiments, similarity determinations may be generated using techniques in addition to, or instead of, certain of those techniques discussed in conjunction with the FIG. 3 embodiment.

In accordance with certain embodiments of the present invention, image processor 218 (FIG. 2) or other appropriate entity may perform similarity determination procedures by utilizing any appropriate and effective techniques. For example, in the FIG. 3 embodiment, image processor 218 may perform a similarity determination procedure to determine whether a patch A (P(A)) 314 is similar to a patch B (P(B)) 318. In the FIG. 3 example, patches 314 and 318 are shown in a 3×3 pixel configuration (3 pixels across and 3 pixels down), however, any other appropriate patch configuration or size is equally contemplated.

In the FIG. 3 embodiment, patch A 314 is a target patch with a target pixel A 322 that is the intended subject of an image processing tasks to remove unwanted noise or fill missing pixel values. In the FIG. 3 embodiment, patch B 318 is a candidate patch with a center pixel B 324 that corresponds to target pixel 322 of target patch 314. In addition, patches 314 and 318 also contain other pairs of corresponding pixels that each share a similar relative location in their respective patches. For example, the top left pixel of target patch 314 corresponds to the top left pixel of candidate patch 318. A pair of corresponding pixels is similar if candidate patch 318 is determined to be similar to target patch 314.

In the FIG. 3 embodiment, candidate patch 318 is determined to be a similar patch with respect to target patch 314 if a similarity distance between the two patches 314 and 318 is less than a selectable similarity threshold value. In certain embodiments, the similarity determination procedure may be expressed by the following formula:

$$\text{Similar if distance}(P(A), P(B)) < t^* \sigma.$$

where t is a selectable constant value and σ (sigma) is the standard error of local image pixel values, which indicates the level of degradation of image quality. In certain embodiments, σ (sigma) may be obtained from a look-up table that contains sigma values that are based on the pixel values of corresponding pixel. In certain embodiments, a given sigma value may be an increasing function of a magnitude of a selected pixel value, such as the center pixel 322 of the target patch.

In certain embodiments, the value of distance(P(A),P(B)) may be defined as the summation of the absolute values of the individual differences of each pair of corresponding pixels in target patch 314 and candidate patch 318. As mentioned above, the corresponding pixels each share a similar relative location in their respective patches. In the FIG. 3 embodiment, if candidate patch 318 is sufficiently similar to target patch 314, then candidate patch 318 may then be classified as a similar patch 318. In accordance with certain embodiments of the present invention, the corresponding pixels from similar patches may form a collection of similar pixels. Averages, medians, or other appropriate statistics of these similar pixels may then be substituted for the original pixels in target patch 314 to thereby produce a processed patch.

The present invention utilizes several improved techniques for obtaining improved estimations of the sigma values referred to above. For example, one technique pre-filters unprocessed image data 216 (FIG. 2), and then uses the resulting filtered image data to estimate the local standard error σ (sigma). In another improved technique, for the same target pixel 322, image processor 218 may perform similar pixels detection and get an intermediate pixel value a number of times based on different estimated a (sigma values), and may then combine these intermediate pixel values to generate final pixel value. Possible methods to combine the intermediate pixel values include taking averages, medians, or other appropriate statistics of the intermediate pixel values. Additional details regarding the performance of improved similarity determination procedures are further discussed below in conjunction with FIGS. 4 through 8.

Figure 4:
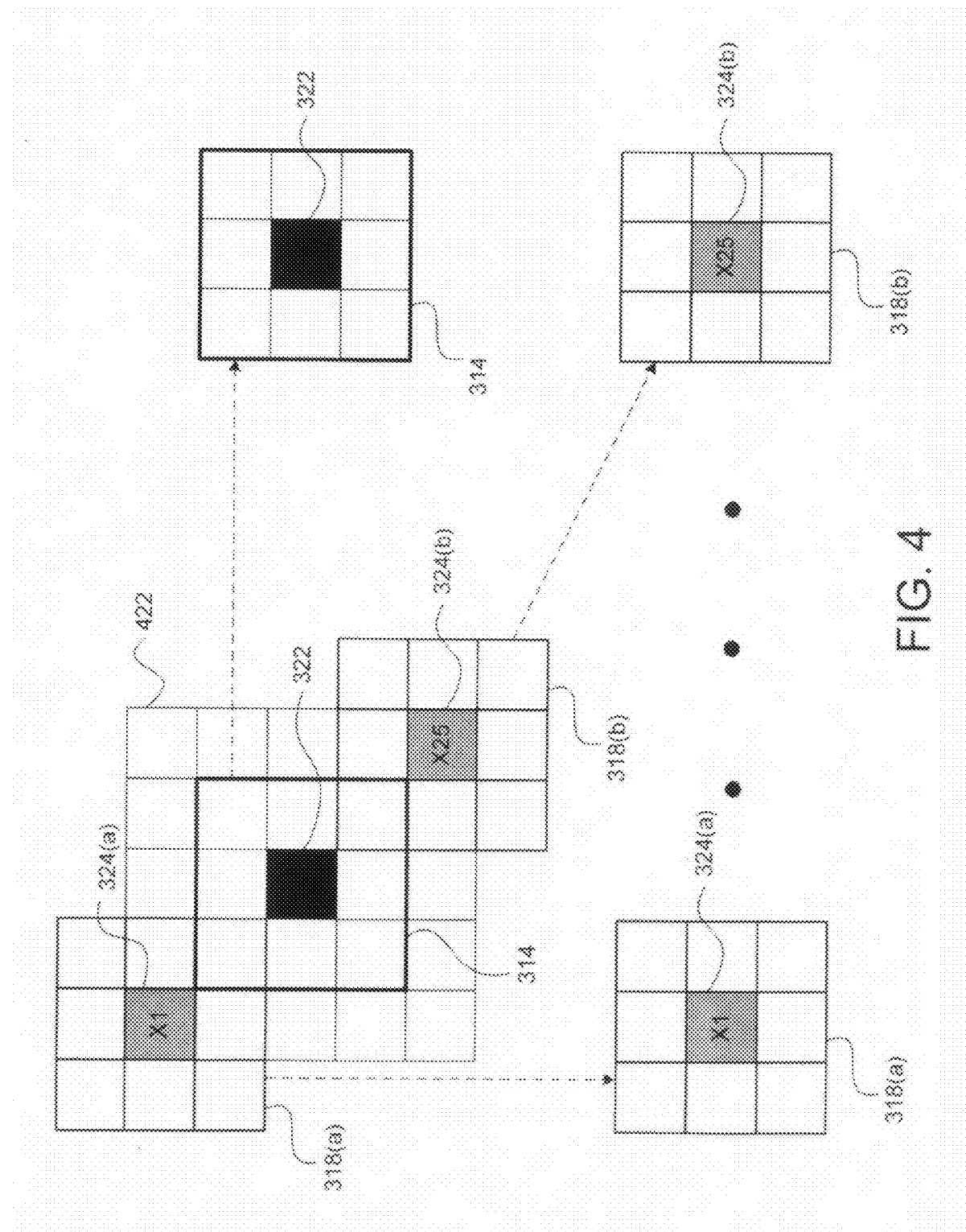
FIG. 4 is a diagram for illustrating a local image similarity measuring procedure in accordance with one embodiment of the present invention.

Referring now to FIG. 4, a diagram for illustrating a local image similarity measuring is shown, in accordance with one embodiment of the present invention. The FIG. 4 embodiment is presented for purposes of illustration, and in alternate embodiments, local image similarity measuring procedures may be performed using techniques in addition to, or instead of, certain of those techniques discussed in conjunction with the FIG. 4 embodiment.

In the FIG. 4 embodiment, a target patch 314 is shown within a surrounding window 422. Target patch 314 includes a central target pixel 322 that is the intended subject of a current local image similarity measuring procedure. In the FIG. 4 embodiment, a first candidate patch 318(a) and a twenty-fifth candidate patch 318(b) are also shown. First candidate patch 318(a) includes a first center pixel X1 324(a), and twenty-fifth candidate patch 318(b) includes a twenty-fifth center pixel X25 324(b).

It should be noted that first center pixel X1 324(a) corresponds to the top left pixel of window 422, and that twenty-fifth center pixel X25 324(b) corresponds to the bottom left pixel of window 422. The FIG. 4 drawing also includes three ellipses that connect first candidate patch 318(a) and twenty-fifth candidate patch 318(b) to represent twenty-three additional candidate patches 318 whose center pixels 324 are sequentially located in window 422 between first center pixel X1 324(a) and twenty-fifth center pixel X25 324(b). For example, a fifth candidate patch 318 (not shown) may have a fifth center pixel 324 that is located on the top right pixel of window 422. Similarly, a twenty-first candidate patch 318 (not shown) may have a twenty-first center pixel 324 that is located on the bottom left pixel of window 422.

In the FIG. 4 embodiment, target patch 314 and candidate patches 318 are shown in 3×3 pixel configurations, and window 422 is shown with a 5×5 pixel configuration. However, in alternate embodiments, any other size or configuration is equally contemplated for window 422, target patch 314 and candidate patches 318. Additional details regarding the performance of local image similarity measuring procedures are further discussed below in conjunction with FIGS. 5A through 8.

Figure 5A:
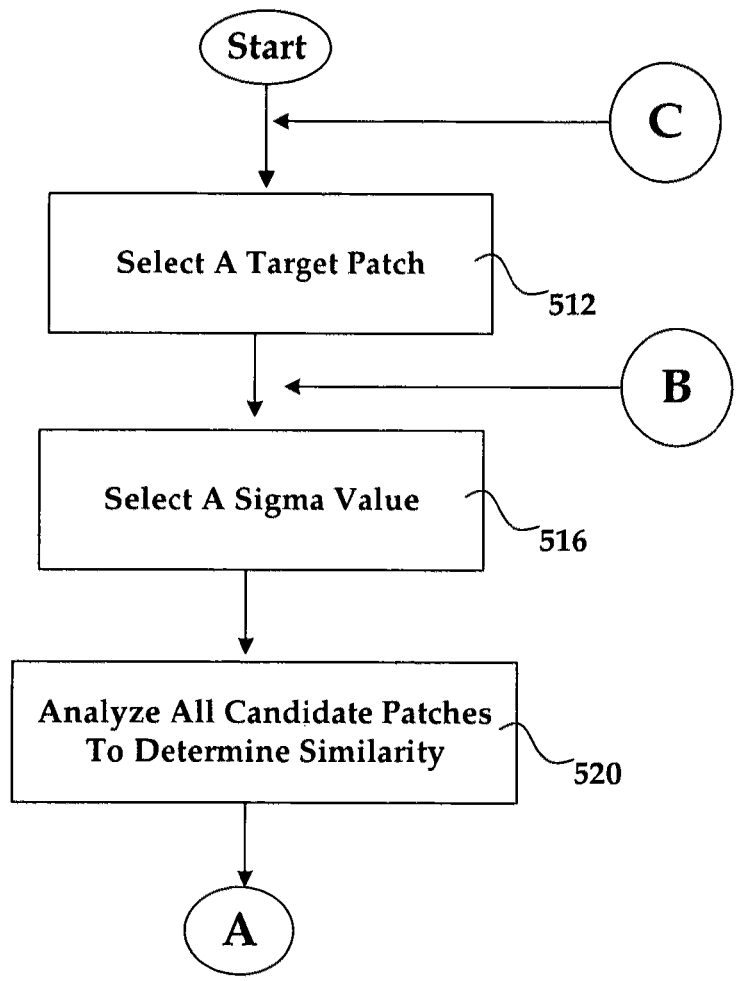
FIGS. 5A-5B are a flowchart of method steps for performing an image processing task along with a local image similarity measuring procedure, in accordance with a first embodiment of the present invention.
Figure 5B:
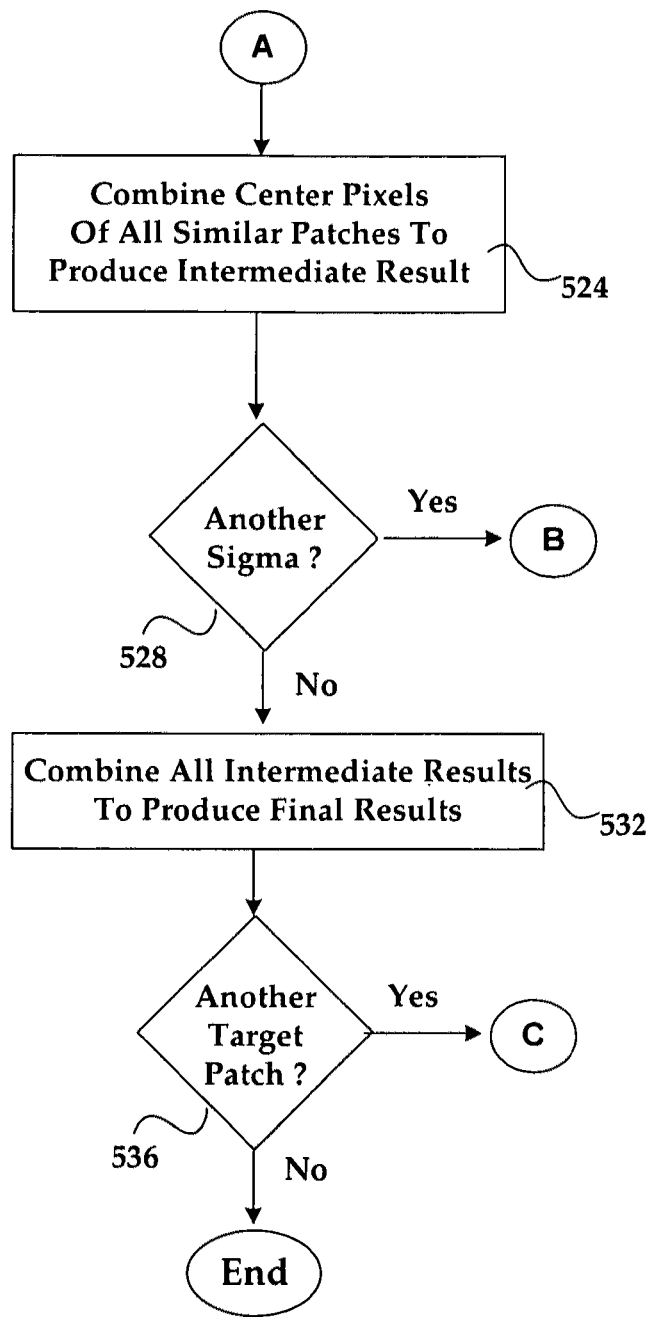

Referring now to FIGS. 5A-5B, a flowchart of method steps for performing an image processing task along with a local image similarity measurement procedure is shown, in accordance with a first embodiment of the present invention. The FIG. 5 example is presented for purposes of illustration, and in alternate embodiments, the present invention may utilize steps and sequences in addition to, or instead of, certain of those steps and sequences discussed in conjunction with the FIG. 5 embodiment. The sequence of method steps disclosed below may best be understood with reference to certain elements discussed above in conjunction with FIG. 4.

In step 512 of the FIG. 5 embodiment, an image processor 218 (FIG. 2) or other appropriate entity initially selects a target patch 314 in a window 422 of image data 216. In step 516, the image processor 218 then selects a current sigma value for performing a similarity determination procedure to assess the similarity of candidate patches 318 with respect to the target patch 314. In certain embodiments, the sigma value may be based upon the relative magnitude of a selectable pixel in target patch 314. In the FIG. 5 embodiment, image processor 218 may efficiently obtain the sigma value from a lookup table that has been previously calculated with sigma values for all possible pixel values.

In step 520, the image processor 218 may then utilize the current sigma value to analyze the similarity of all candidate patches 318 with respect to the target patch 314 to thereby determine which candidate patches 318 may be classified as similar patches. In step 524, the image processor 218 then take averages, medians, or other appropriate statistics of the center pixels 324 of all similar patches to produce an intermediate result. The details about step 524 may depend on the image processing tasks that include, but not limited to, demosaicing and denoising. In step 528, the image processor 218 next determines whether any unused sigma values remain from other pixel locations in target patch 314. If additional sigma values remain, then the FIG. 5 process loops back to step 516 and calculates another intermediate result in a similar manner with a new unused current sigma value.

However, if all possible sigma values corresponding to pixels in target patch 314 have been utilized to calculate intermediate values, then in step 532, the image processor 218 combines all the current intermediate results to produce a final result pixel for replacing the target pixel 322 in the current target patch 314. Possible methods of combining include taking averages, medians, and other appropriate statistics of current intermediate results. In step 536, the image processor 218 determines whether any target patches 314 remain without their respective target pixels 322 processed. If additional target patches 314 remain, then the FIG. 5 process loops back to step 512, moves to a new current target patch 314, and derives a new processed pixel in a similar manner to replace the current target pixel 322. However, if all target pixels 322 in the image 216 have been processed, then the FIG. 5 process may terminate.

Figure 6A:
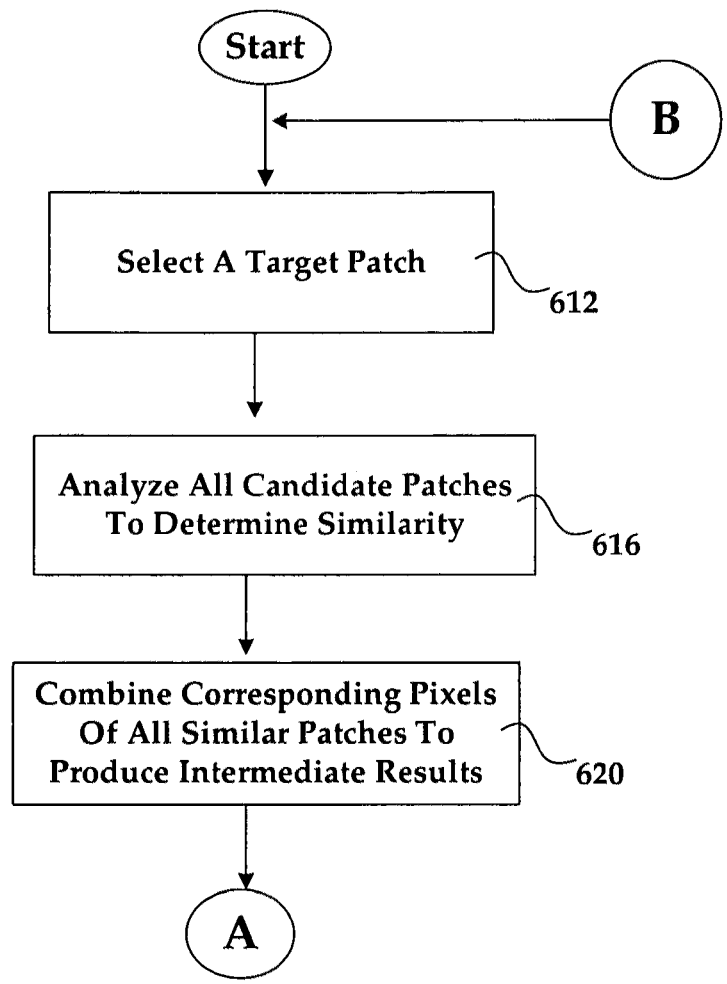
FIGS. 6A-6B are a flowchart of method steps for performing an image processing task along with a local image similarity measuring procedure, in accordance with a preferred embodiment of the present invention.
Figure 6B:
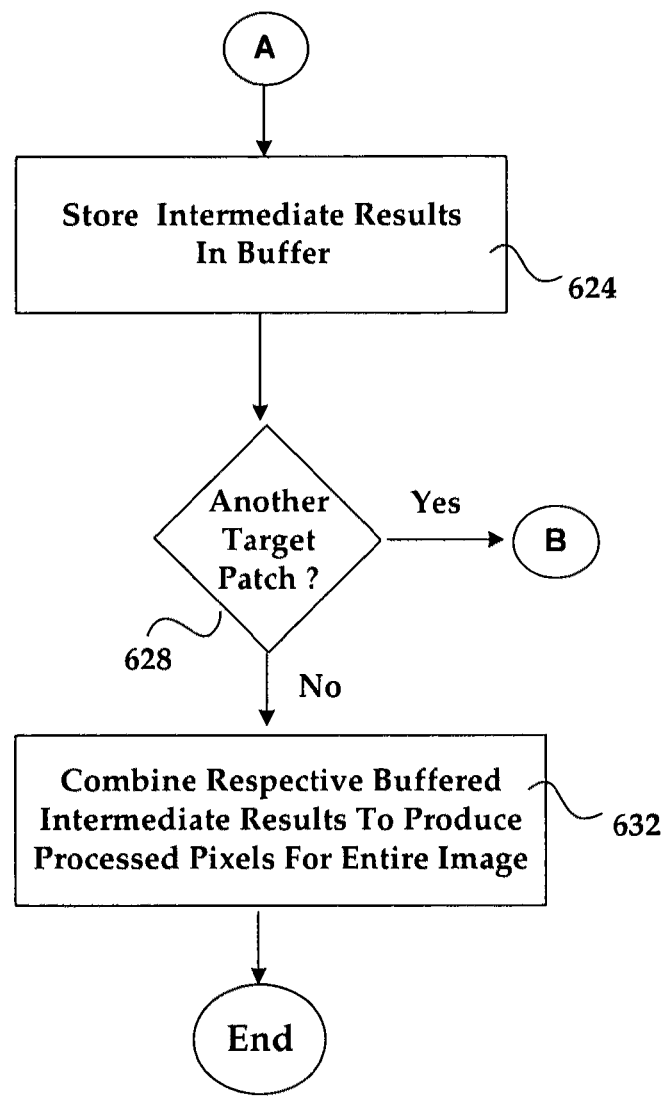

Referring now to FIGS. 6A-6B, a flowchart of method steps for performing an image processing task along with a local image similarity measurement procedure is shown, in accordance with a preferred embodiment of the present invention. The FIG. 6 example is presented for purposes of illustration, and in alternate embodiments, the present invention may utilize steps and sequences in addition to, or instead of, certain of those steps and sequences discussed in conjunction with the FIG. 6 embodiment. The sequence of method steps disclosed below may best be understood with reference to certain elements discussed above in conjunction with FIG. 4.

In step 612 of the FIG. 6 embodiment, an image processor 218 (FIG. 2) or other appropriate entity initially selects a target patch 314 in a window 422 of image data 216. In step 616, the image processor 218 may then analyze the similarity of all candidate patches 318 with respect to the target patch 314 to thereby determine which candidate patches 318 may be classified as similar patches. In the FIG. 6 embodiment, the image processor 218 selects a current sigma value for performing the similarity determination procedure based upon the relative magnitude of a center target pixel 322 from the current target patch 314. In the FIG. 6 embodiment, the image processor 218 may efficiently obtain the sigma value from a lookup table that has been previously calculated with sigma values for all possible pixel values.

In step 620 of the FIG. 6 embodiment, the image processor 218 then utilizes a three-dimensional (3D) pixel array of the similar patches and the target patch to perform an intermediate-result calculation procedure during which the image processor 218 calculates averages, medians, or other appropriate statistics of corresponding pixels from all the similar patches and the target patch to produce a set of intermediate results for the entire target patch 314. The details of step 620 may depend on image processing tasks including, but not limited to, demosaicing and denoising. The foregoing 3D pixel array and the intermediate-result calculation procedure are further discussed below in conjunction with FIG. 7.

In step 624, the image processor 218 stores the foregoing set of intermediate results for the entire current target patch 314 into an intermediate results buffer 222. Additional details for utilizing the intermediate results buffer 222 are further discussed below in conjunction with FIG. 8. In step 628, the image processor 218 determines whether any target patches 314 remain that have not been subject to the foregoing intermediate-results calculation procedure. If additional target patches 314 remain, then the FIG. 6 process loops back to step 612, moves to a new current target patch 314, and derives a new set of intermediate results in a similar manner for storage in the intermediate results buffer 222.

Finally, in step 632, the image processor 218 may perform an intermediate-results combination procedure that separately calculates averages, medians, or other appropriate statistics of the buffered intermediate results for each of the respective pixel locations to produce corresponding processed pixels 220 for the entire image 216. The FIG. 6 process may then terminate. For all of the foregoing reasons, the present invention thus provides an improved method for effectively performing local image similarity measurement and a system equipped with such a method to effectively performing an image processing tasks such as demosaicing and denoising, etc.

Figure 7:
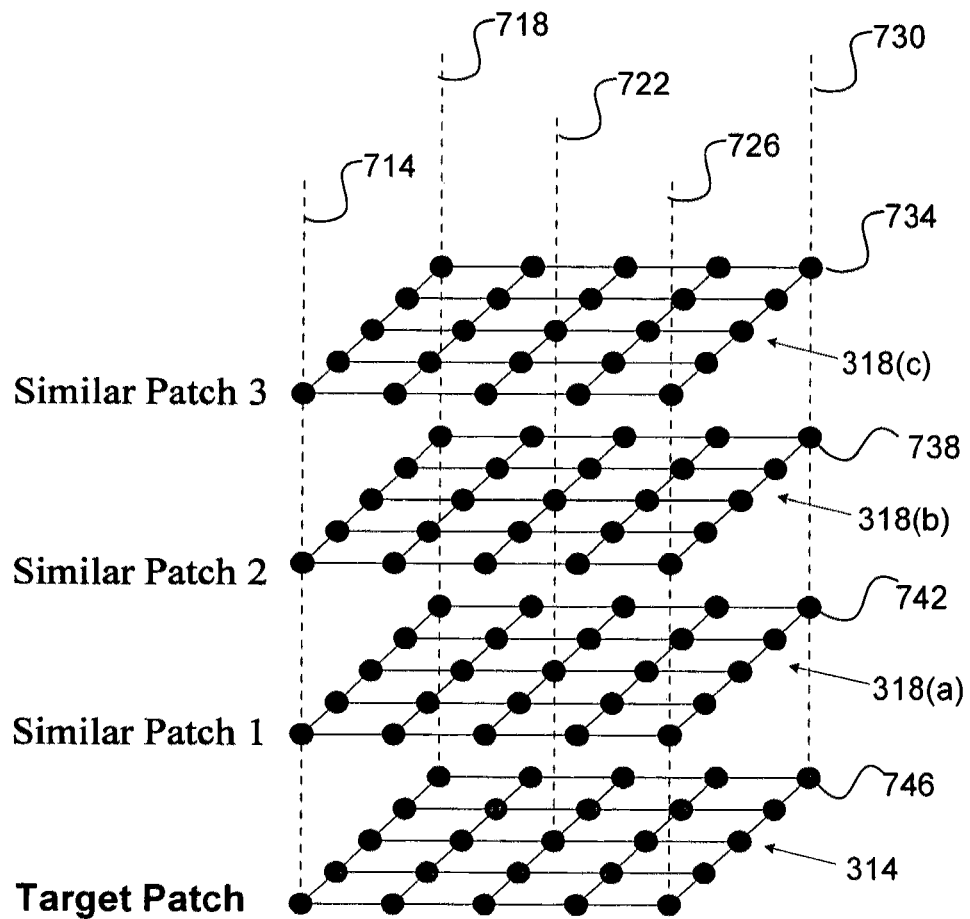
FIG. 7 is a diagram for illustrating an intermediate results combination procedure, in accordance with one embodiment of the present invention.

Referring now to FIG. 7, a diagram for illustrating an intermediate result calculation procedure is shown, in accordance with one embodiment of the present invention. The FIG. 7 example is presented for purposes of illustration, and in alternate embodiments, intermediate results may be calculated using techniques in addition to, or instead of, certain of those techniques discussed in conjunction with the FIG. 7 embodiment. In certain embodiments, the FIG. 7 embodiment may correspond to step 620 of the foregoing FIG. 6.

In the FIG. 7 embodiment, image processor 218 (FIG. 2) or other appropriate entity may utilize a three-dimensional (3D) array 712 for performing the intermediate result calculation procedure. In the FIG. 7 embodiment, 3D array 712 includes, but is not limited to, a target patch 314, a similar patch 1 (318(a)), a similar patch 2 (318(b)), and a similar patch 3 (318(c)). In alternate embodiments, 3D array 712 may include any appropriate number of similar patches 318.

In accordance with the present invention, each of the similar patches 318 have pixels that correspond to respective pixels of target patch 314 because these corresponding pixels have the same relative position in their individual patches. In the FIG. 7 embodiment, this correspondence is illustrated with a vertical axis that passes through exemplary sets of corresponding pixels. For example, a set of corresponding top right pixels 734, 738, 742, and 746 is linked by axis 730, Similarly, axis 714 links a set of corresponding bottom left pixels, axis 718 links a set of corresponding top left pixels, axis 726 links a set of corresponding bottom right pixels, and axis 722 links a set of corresponding center pixels. The remaining pixels of the 3D array 712 also have similar corresponding relationships.

In the FIG. 7 embodiment, image processor 218 may perform the intermediate result calculation procedure by calculating respective averages, medians, or other appropriate statistics for each set of corresponding pixels in 3D array 712. For example, an intermediate result may be calculated for pixel 746 of target patch 314 by averaging the values of pixels 734, 738, 742, and 746. Intermediate results for all of the other pixels locations in target patch 314 may be similarly calculated by averaging their respective corresponding pixels from the 3D array 712.

In the FIG. 7 embodiment, utilization of all possible similarities among the patches in 3D array 712 provides an efficient implementation by performing similar pixel detection multiple times for the same pixel. Local standard error may be estimated based on the center pixel of target patch 314. The present invention thus effectively performs similar pixel detections for each pixel location of the target patch 314. Since each pixel location may involve in different target patches, multiple similar pixel detections for the same pixel may therefore be obtained.

Figure 8:
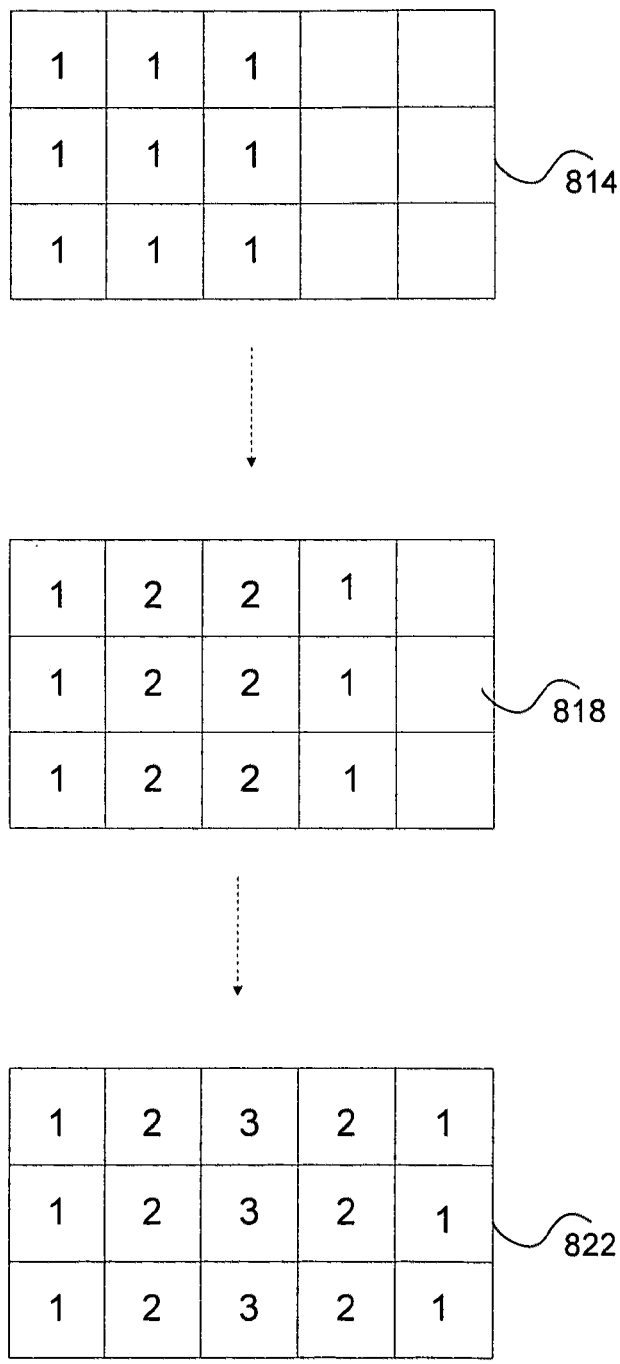
FIG. 8 is a diagram for illustrating buffered intermediate results, in accordance with one embodiment of the present invention.

Referring now to FIG. 8, a diagram for illustrating buffered intermediate results is shown, in accordance with one embodiment of the present invention. The FIG. 8 embodiment is presented for purposes of illustration, and in alternate embodiments, buffered intermediate results may be implemented using elements and configurations in addition to, or instead of, certain of those elements and configurations discussed in conjunction with the FIG. 8 embodiment.

In the FIG. 8 embodiment, three iterations 814, 818, and 822 of the intermediate result calculation procedure of FIG. 7 are depicted with the current number of intermediate values being shown in contiguous squares that represent respective pixel locations in an intermediate results buffer 222 (FIG. 2). The three iterations of the FIG. 8 example are presented for purposes of illustrations, however any desired number of intermediate results or memory configurations may be utilized depending upon various factors such as the selected patch size. Furthermore, the FIG. 8 example relates to patches that are 3×3 pixels in size. However, any other size of patch is equally contemplated for use in the present invention.

In the first iteration 814 of the intermediate results calculation procedure, intermediate results buffer 222 is shown with one intermediate result in each of the nine pixel locations of the target patch 314. In the second iteration 818 of the intermediate results calculation procedure, the target patch 314 is shifted one pixel to the right in window 422 (FIG. 4). After, the second iteration 818, intermediate results buffer 222 is now shown with two intermediate results for the pixel locations in columns 2 and 3 of the intermediate results buffer 222. In the third iteration 822 of the intermediate results calculation procedure, the target patch 314 is shifted yet one more pixel to the right in window 422 (FIG. 4).

After, the third iteration 822, intermediate results buffer 222 is now shown with three intermediate results for the pixel locations in column 3 and two intermediate results for the pixel locations in column 4 of the intermediate results buffer 222. From the foregoing series of iterations, it can be seen that multiple intermediate results for a given pixel location are being stored in the buffer 222 as the target patch 314 is repositioned and the intermediate results calculation procedure is repeated. The image processor 218 then combines multiple intermediate results to produce a final processed pixel. Such approach advantageously allows the present invention to provide improved image processing performance for image data 216.

In accordance with certain embodiments of the present invention, a maximum number of possible intermediate results for a given pixel location in intermediate results buffer 222 may be calculated depending upon factors such as the size and configuration of target patch 314. In order to advantageously conserve memory resources in device memory 126, once the maximum number of possible intermediate results has been reached for a given pixel location or for a given section of intermediate results buffer 222, then the intermediate results in these "full" buffer locations may be combined to produce the final processed pixel value(s). Possible methods of combining include taking averages, medians, or other appropriate statistics. The actual selection may depend on image processing task including, but not limited to, demosaicing and denoising. After the final processed pixel value(s) have been calculated and stored, then these memory locations in intermediate results buffer 222 may be overwritten with new intermediate results to thereby conserve memory space. This rotating storage technique advantageously allows intermediate results buffer 222 to be economically implemented as a delay line or other similar limited memory device.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A method for effectively performing local image similarity measurement and a system equipped with such a method for performing an image processing task with an electronic device, comprising:

an image processor that performs an intermediate-results calculation procedure to calculate intermediate result values that are based upon corresponding pixels of a target patch from a current image frame and similar patches from said current image frame, said image processor moving said target patch of said intermediate-results calculation procedure in a raster order, said image processor performing an intermediate-results combination procedure by calculating appropriate statistics from said intermediate result values to produce processed pixel values; and a processor device that controls said image processor to perform said image processing tasks including, but not limited to, demosaicing and denoising.

2. The system of claim 1 wherein said image processor organizes said target patch and said similar patches into a 3D array for performing said intermediate-results calculation procedure.

3. The system of claim 1 wherein said image processor stores said intermediate result values into an intermediate results buffer after each move of said target patch in said intermediate-results calculation procedure.

4. The system of claim 1 wherein said image processor utilizes said processed pixel values to replace original noisy pixels from captured image data in a denoising task.

5. The system of claim 1 wherein said image processor performs a similarity determination procedure that compares said target patch with a candidate patch to determine whether said candidate patch should be classified as one of said similar patches.

6. The system of claim 5 wherein said similarity determination procedure is expressed with a formula:

$$\text{Similar if distance}(P(A),P(B)) < t*\sigma.$$

where t is a selectable constant value, $\sigma$ is a standard error of local image pixel values called a sigma value, and distance(P(A),P(B)) is a summation of absolute values of individual differences of each pair of corresponding pixels in said target patch and said candidate patch, said corresponding pixels each sharing a similar relative location in their respective patches.

7. The system of claim 6 wherein said sigma value is an increasing function of a magnitude of a selected pixel value.

8. The system of claim 7 wherein said image processor obtains said sigma value from a look-up table that contains sigma values that are based on all possible pixel values.

9. The system of claim 1 wherein said image processor initially selects said target patch that is located in a window of image data.

10. The system of claim 9 wherein said image processor performs similarity determination procedures upon all possible candidate patches to identify said similar patches.

11. The system of claim 10 wherein said image processor utilizes a sigma value based upon a center pixel from said target patch to perform said similarity determination procedures.

12. The system of claim 11 wherein said image processor utilizes a 3D array of said target patch and said similar patches to perform said intermediate-results calculation procedure.

13. The system of claim 12 wherein said image processor takes averages, medians, or other appropriate statistics of sets of corresponding pixels from said 3D array to generate said intermediate result values.

14. The system of claim 13 wherein said image processor stores said intermediate result values into respective pixel locations in an intermediate result buffer.

15. The system of claim 14 wherein said image processor repeatedly moves said target patch to other locations in said image data, said image processor then repeating said intermediate-results calculation procedure until intermediate result values have been calculated for all possible target patches in said image data.

16. The system of claim 15 wherein said image processor performs said intermediate-results combination procedure upon said intermediate result values in said respective pixel locations of said intermediate results buffer to thereby produce said processed pixels.

17. The system of claim 16 wherein certain of said respective pixel locations in said intermediate results buffer contain multiple versions of said intermediate result values for associated ones of said respective pixel locations, said intermediate-results combination procedure improving said processed pixels by combining said multiple versions of said intermediate result values.

18. The system of claim 17 wherein said image processor performs a rotating storage technique with said intermediate results buffer by overwriting a finalized memory location in said intermediate results buffer until a maximum possible number of intermediate results for a given pixel location has been reached.

19. The system of claim 18 wherein said rotating storage technique allows said intermediate results buffer to be economically implemented as a delay line.

20. A method for performing local image similarity measurements and a system equipped such a method with an electronic device, comprising the steps of:

performing an intermediate-results calculation procedure with an image processor to calculate intermediate result values that are based upon corresponding pixels of a target patch from a current image frame and similar patches from said current image frame, said image processor moving said target patch of said intermediate-results calculation procedure in a raster order;

performing an intermediate-results combination procedure with said image processor by calculating appropriate statistics from said intermediate result values to produce processed pixel values; and utilizing a processor device to control said image processor for performing said image processing tasks including, but not limited to, demosaicing and denoising.

* * * * *